(12) United States Patent
Salter et al.

(10) Patent No.: US 11,914,914 B2
(45) Date of Patent: Feb. 27, 2024

(54) VEHICLE INTERFACE CONTROL

(71) Applicant: Ford Global Technologies, LLC, Dearborn, MI (US)

(72) Inventors: Stuart C. Salter, White Lake, MI (US); Hussein H. Berry, Dearborn, MI (US); Lucretia Williams, Bloomfield Hills, MI (US); Monica Lam, Northville, MI (US); John Robert Van Wiemeersch, Novi, MI (US); Clay Carpenter, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/732,649

(22) Filed: Apr. 29, 2022

(65) Prior Publication Data
US 2023/0350621 A1    Nov. 2, 2023

(51) Int. Cl.
*G06F 3/14* (2006.01)
*B60K 35/00* (2006.01)
*B60Q 5/00* (2006.01)
*B60Q 9/00* (2006.01)
*G06V 20/58* (2022.01)
(Continued)

(52) U.S. Cl.
CPC .............. *G06F 3/14* (2013.01); *B60K 35/00* (2013.01); *B60Q 5/00* (2013.01); *B60Q 9/00* (2013.01); *G06V 20/58* (2022.01); *G06V 40/10* (2022.01); *G10L 15/22* (2013.01); *G10L 15/26* (2013.01); *G10L 25/78* (2013.01); *B60K 2370/148* (2019.05); *B60K 2370/152* (2019.05); *B60K 2370/797* (2019.05); *G06V 2201/08* (2022.01)

(58) Field of Classification Search
CPC .......... G06F 3/14; G06V 20/58; G06V 40/10; G06V 2201/08; B60K 35/00; B60K 2370/797; B60K 2370/152; B60K 2370/148; B60Q 5/00; B60Q 9/00; G10L 15/22; G10L 15/26; G10L 25/78
See application file for complete search history.

(56) References Cited

U.S. PATENT DOCUMENTS 7,965,196 B2    6/2011   Liebermann
10,755,691 B1   8/2020   Herman et al.
(Continued)

FOREIGN PATENT DOCUMENTS

CN          107284373 A        10/2017
DE      102014223881 A1 *      5/2016
(Continued)

OTHER PUBLICATIONS

Translation of KR 20210081824 A (Year: 2021).*

*Primary Examiner* — Lixi C Simpson
(74) *Attorney, Agent, or Firm* — Frank Lollo; Bejin Bieneman PLC

(57) ABSTRACT

A system includes a display screen positioned to display on an exterior of a host vehicle, a user interface of the host vehicle, and a computer communicatively coupled to the display screen and the user interface. The computer is programmed to, in response to detecting a target vehicle having prespecified indicia, instruct the user interface to output an instruction to an occupant of the host vehicle, and in response to detecting personnel from the target vehicle, instruct the display screen to output a message to the personnel.

19 Claims, 6 Drawing Sheets

(51) Int. Cl.
*G06V 40/10* (2022.01)
*G10L 15/22* (2006.01)
*G10L 15/26* (2006.01)
*G10L 25/78* (2013.01)

(56) References Cited

U.S. PATENT DOCUMENTS

| | | | |
|---|---|---|---|
| 10,926,635 B2 * | 2/2021 | Kim | G06F 3/167 |
| 11,155,205 B2 | 10/2021 | Pandit et al. | |
| 2015/0077235 A1 * | 3/2015 | Pisz | G06F 3/017 |
| | | | 340/426.23 |
| 2018/0224844 A1 * | 8/2018 | Zhang | H04L 67/1097 |
| 2019/0325125 A1 * | 10/2019 | Pantfoerder | H04W 8/005 |
| 2020/0276973 A1 * | 9/2020 | Meijburg | G08G 1/096811 |
| 2020/0406833 A1 * | 12/2020 | Carter | H04N 23/50 |
| 2021/0201676 A1 * | 7/2021 | Tariq | G08G 1/012 |
| 2021/0250553 A1 * | 8/2021 | Naber, Jr. | B60R 25/302 |
| 2022/0272306 A1 * | 8/2022 | Ross | G06V 20/40 |
| 2022/0383640 A1 * | 12/2022 | Vora | G06T 7/10 |

FOREIGN PATENT DOCUMENTS

| | | | | |
|---|---|---|---|---|
| KR | 20210081824 A | * | 7/2021 | B66B 5/0006 |
| WO | WO-2014046833 A1 | * | 3/2014 | G06F 17/289 |

\* cited by examiner

VEHICLE INTERFACE CONTROL

BACKGROUND

In some situations, an occupant of a vehicle may wish to communicate with an individual outside the vehicle. Many factors can make such communication difficult, including background noise from the environment or the vehicle, a communication impairment of the occupant such as difficulty hearing, lack of a shared language between the occupant and the individual outside, etc. A technological system to facilitate communication between the occupant of the vehicle and the individual outside is therefore useful.

DETAILED DESCRIPTION

Figure 1:
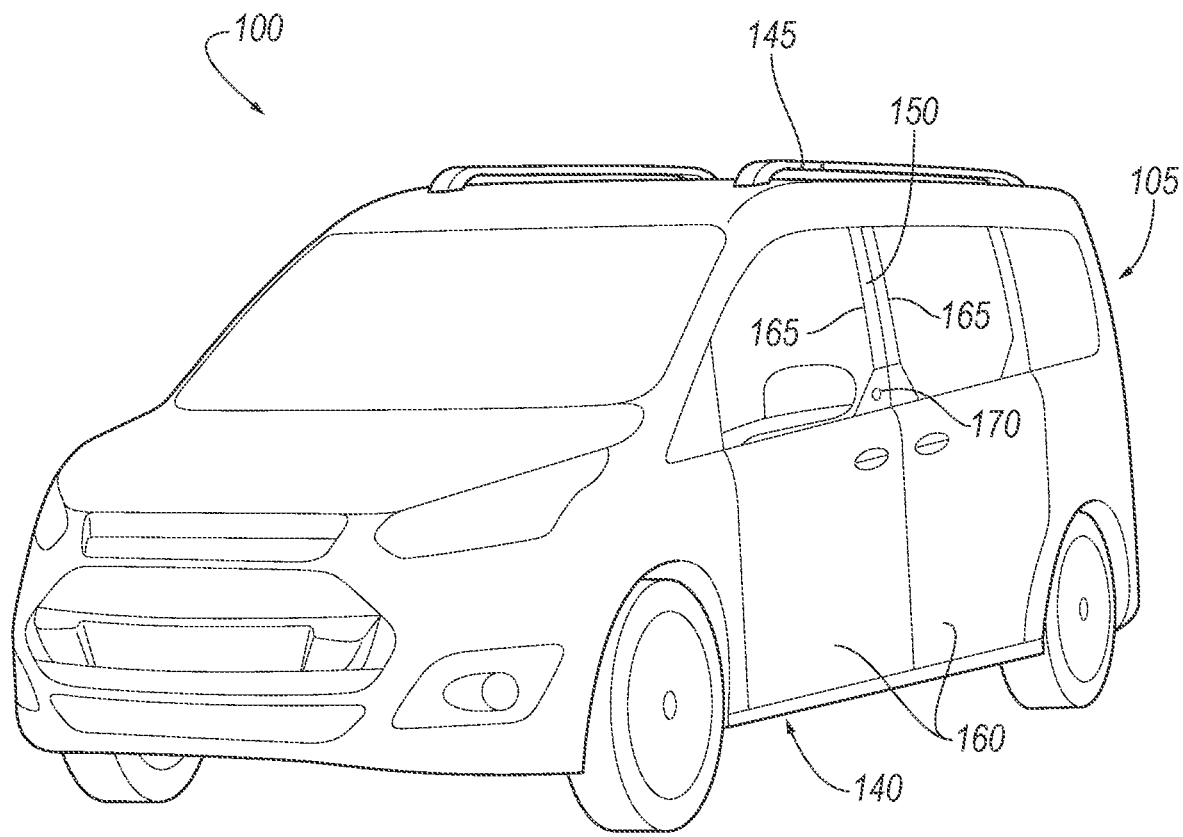
FIG. 1 is a perspective view of an example host vehicle.

This disclosure describes components to facilitate communication between an occupant of a host vehicle and an individual outside the host vehicle. The host vehicle can be equipped with a display screen on its exterior, e.g., on the B pillar; a user interface in the passenger cabin; and a computer communicatively coupled to the display screen and the user interface. The computer can be programmed to, in response to detecting a target vehicle having prespecified indicia, instruct the user interface to output an instruction to the occupant, and in response to detecting personnel from the target vehicle, instruct the display screen to output a message to the personnel. The system of the host vehicle can thus tailor its operation to the personnel from the target vehicle, as opposed to individuals from other vehicles. The instruction to the occupant is tied to detecting the target vehicle, which is identified by the prespecified indicia, and the message to the personnel is tied to detecting the personnel from the already identified target vehicle. The system can behave differently when facilitating communication with other individuals outside the vehicle than when facilitating communication with the personnel from the target vehicle, e.g., not be triggered to automatically activate by other individuals.

A system includes a display screen positioned to display on an exterior of a host vehicle, a user interface of the host vehicle, and a computer of the host vehicle communicatively coupled to the display screen and the user interface. The computer is programmed to, in response to detecting a target vehicle having prespecified indicia, instruct the user interface to output an instruction to an occupant of the host vehicle; and, in response to detecting personnel from the target vehicle, instruct the display screen to output a message to the personnel.

The system may further include an external microphone communicatively coupled to the computer, and the computer may be programmed to, in response to detecting the personnel, instruct the user interface to output a transcription of speech from the personnel detected by the external microphone. Instructing the user interface to output the transcription may be conditional on the personnel being less than a threshold distance from the display screen.

The system may further include an external microphone communicatively coupled to the computer, and the computer may be programmed to, in response to detecting the personnel, instruct the display screen to output a transcription of speech from the personnel detected by the external microphone.

The system may further include a camera communicatively coupled to the computer, and the computer may be programmed to, in response to detecting the personnel, store image data from the camera showing the personnel. The image data may include video data, and the video data is recorded until the personnel is absent.

The system may further include an external microphone communicatively coupled to the computer, and the computer may be programmed to, in response to detecting the personnel, record audio data from the external microphone until the personnel is absent, and store the audio data.

The instruction may indicate to the occupant to pull over the host vehicle.

The message may indicate a communication impairment of the occupant.

The computer may be programmed to, in response to detecting the personnel, instruct the user interface to output a plurality of possible responses to the occupant, and upon receiving a selection of one of the possible responses, instruct the display screen to output the selected possible response.

The computer may be programmed to, in response to detecting the personnel, output a stored electronic document. Outputting the stored electronic document may be conditional on receiving an approval from the occupant via the user interface. The computer may be programmed to, in response to detecting the personnel, instruct the user interface to prompt the occupant for the approval.

Outputting the stored electronic document may include instructing the display screen to display the stored electronic document.

Outputting the stored electronic document may include transmitting the stored electronic document to a device that is remote from the host vehicle.

The stored electronic document may include at least one of a driver's license, a registration of the host vehicle, or insurance documentation.

Instructing the display screen to output the message may be conditional on receiving an approval from the occupant via the user interface. The computer may be programmed to, in response to detecting the personnel, instruct the user interface to prompt the occupant for the approval.

Instructing the display screen to output the message may be conditional on the host vehicle being stopped.

A method includes, in response to detecting a target vehicle having prespecified indicia, instructing a user interface of a host vehicle to output an instruction to an occupant of the host vehicle; and in response to detecting personnel from the target vehicle, instructing a display screen of the host vehicle to output a message to the personnel, wherein the display screen is positioned to display on an exterior of the host vehicle.

With reference to the Figures, wherein like numerals indicate like parts throughout the several views, a system 105 of a host vehicle 100 includes a display screen 110 positioned to display on an exterior of the host vehicle 100, a user interface 115 of the host vehicle 100, and a computer 120 communicatively coupled to the display screen 110 and the user interface 115. The computer 120 is programmed to, in response to detecting a target vehicle 125 having pre-specified indicia 210, instruct the user interface 115 to output an instruction to an occupant 130 of the host vehicle 100, and in response to detecting personnel 135 from the target vehicle 125, instruct the display screen 110 to output a message to the personnel 135.

With reference to FIG. 1, the host vehicle 100 may be any passenger or commercial automobile such as a car, a truck, a sport utility vehicle, a crossover, a van, a minivan, a taxi, a bus, etc.

The host vehicle 100 includes a body 140. The host vehicle 100 may be of a unibody construction, in which a frame and the body 140 of the host vehicle 100 are a single component. The host vehicle 100 may, alternatively, be of a body-on-frame construction, in which the frame supports the body 140 that is a separate component from the frame. The frame and body 140 may be formed of any suitable material, for example, steel, aluminum, etc.

The system 105 of the host vehicle 100 can include a camera 145. The camera 145 is mounted on the host vehicle 100, e.g., to the body 140 of the host vehicle 100. The camera 145 is aimed externally to the host vehicle 100, i.e., has a field of view encompassing an area outside the host vehicle 100, e.g., is oriented away from the host vehicle 100, e.g., is on a roof rack and aimed laterally relative to the host vehicle 100. This orientation can detect the personnel 135 when approaching the doors 160.

The camera 145 can detect electromagnetic radiation in some range of wavelengths. For example, the camera 145 may detect visible light, infrared radiation, ultraviolet light, or some range of wavelengths including visible, infrared, and/or ultraviolet light. For example, the camera 145 can be a charge-coupled device (CCD), complementary metal oxide semiconductor (CMOS), or any other suitable type.

Figure 2:
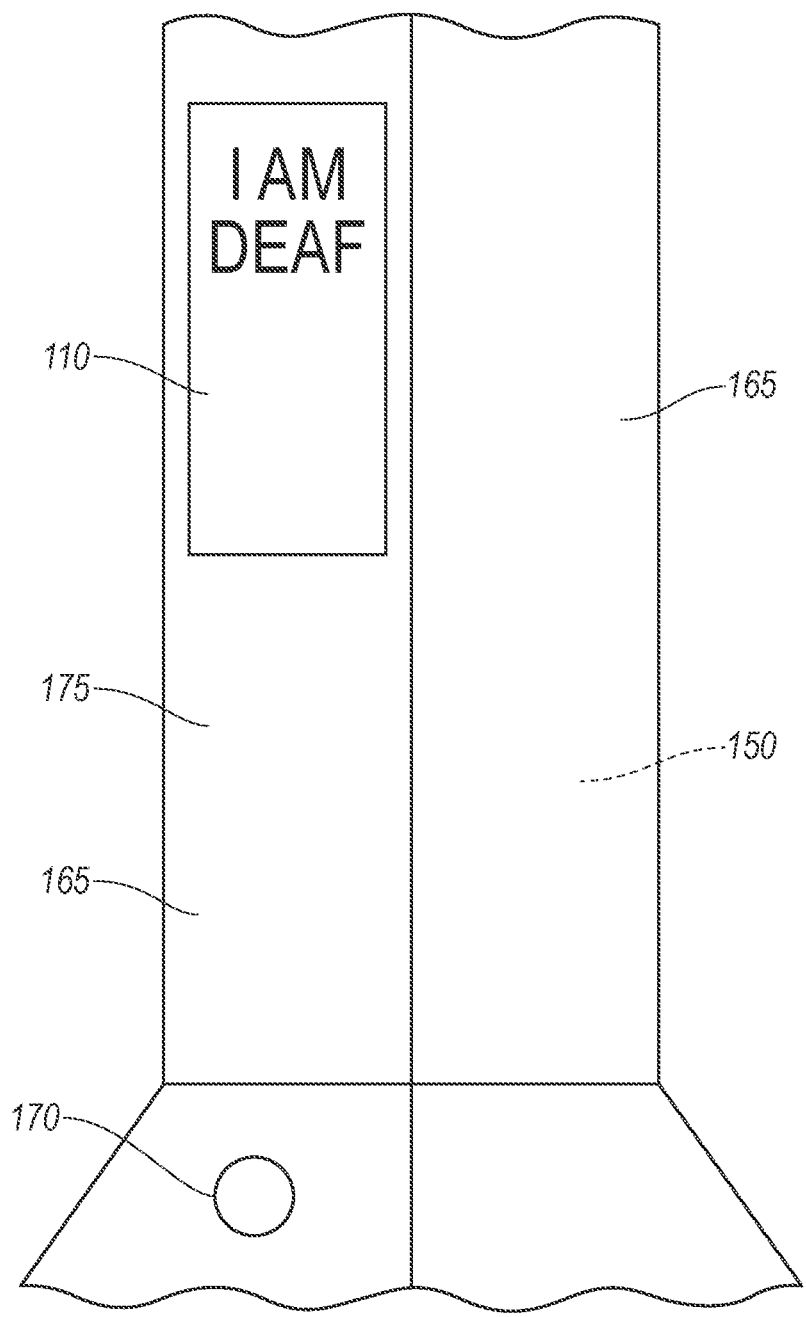
FIG. 2 is a side view of a portion of doors of the host vehicle.

With reference to FIG. 2, the display screen 110 is positioned to display on an exterior of the host vehicle 100, and is thus outside a passenger cabin 155 of the host vehicle 100. For example, the display screen 110 can be mounted to the body 140 of the host vehicle 100, e.g., a B pillar 150 of the body 140, or to a door panel 165 of a door 160 of the host vehicle 100. The display screen 110 on the door panel 165 can be directly outboard of the B pillar 150. Mounting the display screen 110 next to the B pillar can locate the display screen 110 next to the position of the occupant 130 regardless of whether the occupant is in the front or rear of the host vehicle 100. The display screen 110 is thus easily visible to someone approaching one of the doors 160 of the host vehicle 100. For another example, the display screen 110 can include a projector such as a Digital Light Projector (DLP) mounted in the passenger cabin 155 that throws a display image on a window of the vehicle. The window can include a film that is reactive to light of particular wavelengths, e.g., light projected by the projector onto the window. For example, the film can include a phosphor coating or a quantum dot coating.

The display screen 110 can be any suitable type for displaying content legible to a person standing outside the host vehicle 100, e.g., light-emitting diode (LED), organic light-emitting diode (OLED), liquid crystal display (LCD), plasma, digital light processing technology (DLPT), etc. The display screen 110 can be a touchscreen and can accept inputs.

Figure 3:
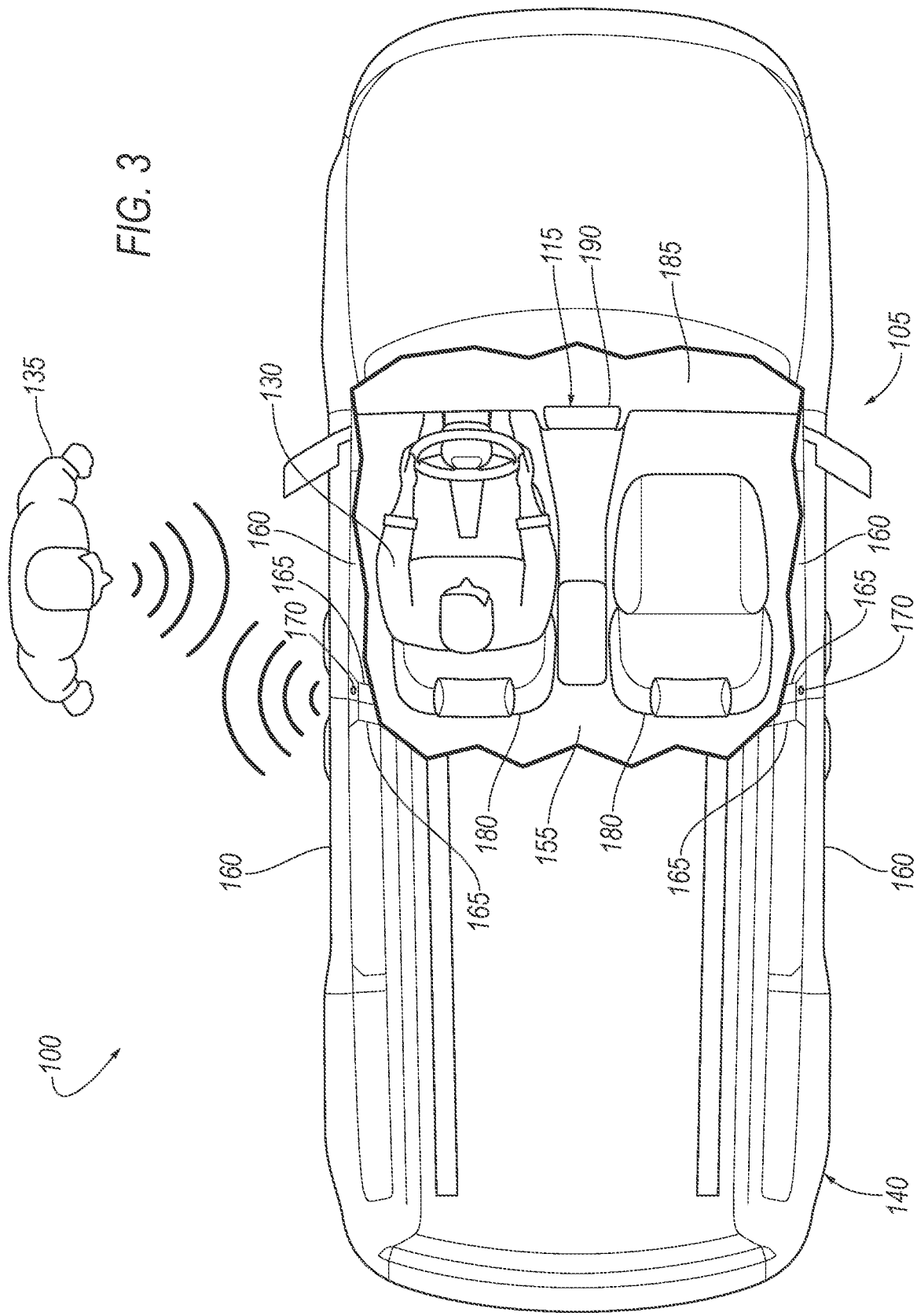
FIG. 3 is a top view of the host vehicle with a passenger cabin exposed for illustration.

The system 105 of the host vehicle 100 can include an external microphone 170. The external microphone 170 can be mounted outside the passenger cabin 155 of the host vehicle 100, e.g., attached to outward-facing components of the host vehicle 100. The external microphone 170 can be directed externally to the host vehicle 100, i.e., oriented to detect sounds originating from sources spaced from the host vehicle 100. For example, as shown in FIGS. 1-3, the external microphone 170 can be mounted to and possibly be part of the door panel 165. The external microphone 170 can be mounted on a side of the vehicle, e.g., the driver side of the vehicle as shown in the Figures.

The external microphone 170 is a transducer that converts sound into electrical signals. The external microphone 170 can be any suitable type for receiving sound from someone talking outside the host vehicle 100, e.g., a dynamic microphone, a condenser microphone, a piezoelectric microphone, a transducer-on-glass microphone, a transducer-on-trim microphone, etc. If the external microphone 170 is a transducer-on-trim microphone, the external microphone 170 is part of the door panel 165. An advantage of the external microphone 170 being a transducer-on-trim microphone is that it is more difficult for environmental factors to interfere with performance of a transducer-on-trim microphone. A single piece of debris (e.g., dirt, mud, ice, snow) can significantly block or attenuate other types of microphones than transducer-on-trim microphones from sampling sounds.

The system 105 of the host vehicle 100 can include an external speaker 175. The external speaker 175 can be mounted outside the passenger cabin 155 of the host vehicle 100, e.g., attached to outward-facing components of the host vehicle 100, mounted in the passenger cabin 155, or both. The external speaker 175 can be directed externally to the host vehicle 100, i.e., oriented to project sound away from the host vehicle 100, even if mounted inside the passenger cabin 155. For example, as shown in FIGS. 1-3, the external speaker 175 is mounted to the door panel 165 directly outboard of the B pillar 150 of the host vehicle 100. The external speaker 175 can be mounted to the same side of the host vehicle 100 as the external microphone 170. For another example, when mounted inside the passenger cabin 155, the external speakers 175 can be used when the window has been rolled down, either to augment or be used in place of another external speaker 175 mounted on an exterior of the host vehicle 100, to provide higher fidelity audio for improved clarity.

The external speaker 175 can be any suitable type of speaker audible to someone when they are relatively close to the host vehicle 100. In particular, the external speaker 175 can be a panel exciter, i.e., which generates sound by vibrating a rigid panel. For example, an electric motor can be adhered to an inboard side of the door panel 165 and impart vibrations to the door panel 165 to generate sound. An advantage of the external speaker 175 being a panel exciter rather than a point speaker is that it is more difficult for environmental factors to interfere with performance of the external speaker 175. A single piece of debris (e.g., dirt, mud, ice, snow) can significantly block or attenuate sound from a point speaker but not from a panel exciter.

With reference to FIG. 3, the vehicle includes a passenger cabin 155 to house the occupants 130 of the vehicle. The passenger cabin 155 includes one or more front seats 180 disposed at a front of the passenger cabin 155, in which the occupant 130 may be sitting, and one or more back seats 180 (not shown) disposed behind the front seats 180. The passenger cabin 155 may also include third-row seats 180 (not shown) at a rear of the passenger cabin 155.

The user interface 115 presents information to and receives information from the occupant 130 of the host vehicle 100. The user interface 115 may be located, e.g., on an instrument panel 185 in a passenger cabin 155 of the vehicle, or wherever may be readily seen by the occupant 130, e.g., from the back seats 180, such as if the host vehicle 100 is an autonomous vehicle and the front seats 180 are unoccupied. The user interface 115 may include dials, digital readouts, a UI screen 190, speakers, and so on for providing information to the occupant 130, e.g., human-machine interface (HMI) elements such as are known. The user interface 115 may include buttons, knobs, keypads, a microphone, touchscreen input on the UI screen 190, and so on for receiving information from the occupant 130.

The UI screen 190 can be any suitable type for displaying content legible to the occupant 130, e.g., light-emitting diode (LED), organic light-emitting diode (OLED), liquid crystal display (LCD), plasma, digital light processing technology (DLPT), etc.

Figure 4:
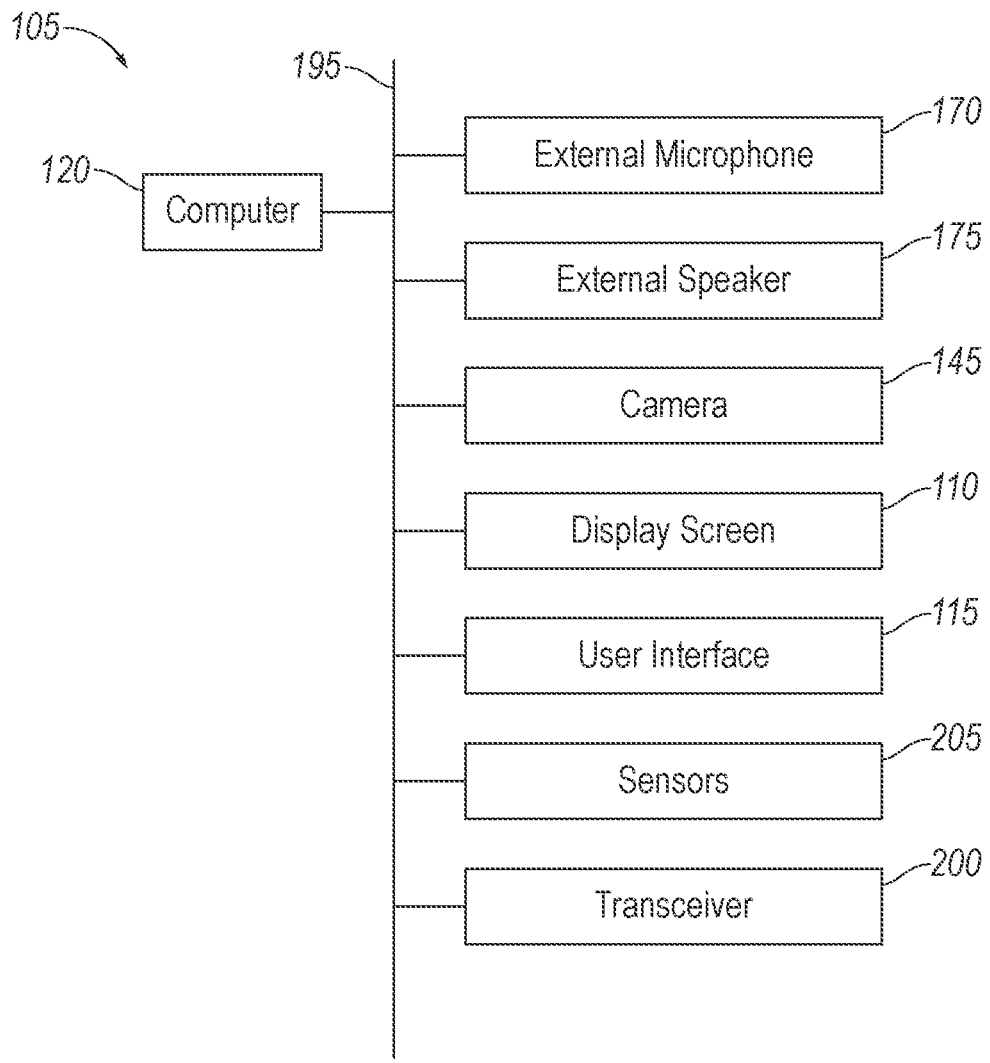
FIG. 4 is a block diagram of a system of the host vehicle.

With reference to FIG. 4, the computer 120 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 120 can thus include a processor, a memory, etc. The memory of the computer 120 can include media for storing instructions executable by the processor as well as for electronically storing data and/or databases, and/or the computer 120 can include structures such as the foregoing by which programming is provided. The computer 120 can be multiple computers coupled together.

The computer 120 may transmit and receive data through a communications network 195 such as a controller area network (CAN) bus, Ethernet, WiFi, Local Interconnect Network (LIN), onboard diagnostics connector (OBD-II), and/or by any other wired or wireless communications network. The computer 120 may be communicatively coupled to the external microphone 170, the external speaker 175, the camera 145, the display screen 110, the user interface 115, sensors 205, a transceiver 200, and other components via the communications network 195.

The sensors 205 may detect the external world, e.g., objects and/or characteristics of surroundings of the host vehicle 100, such as other vehicles, road lane markings, traffic lights and/or signs, pedestrians, etc. For example, the sensors 205 may include radar sensors, ultrasonic sensors, scanning laser range finders, light detection and ranging (lidar) devices, and image processing sensors such as the camera 145.

The transceiver 200 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 200 may be adapted to communicate with a remote server, that is, a server distinct and spaced from the host vehicle 100. The remote server may be located outside the host vehicle 100. For example, the remote server may be associated with another vehicle (e.g., V2V communications), an infrastructure component (e.g., V2I communications), a mobile device associated with the owner of the host vehicle 100 or with someone near the host vehicle 100, etc. The transceiver 200 may be one device or may include a separate transmitter and receiver.

Figure 5:
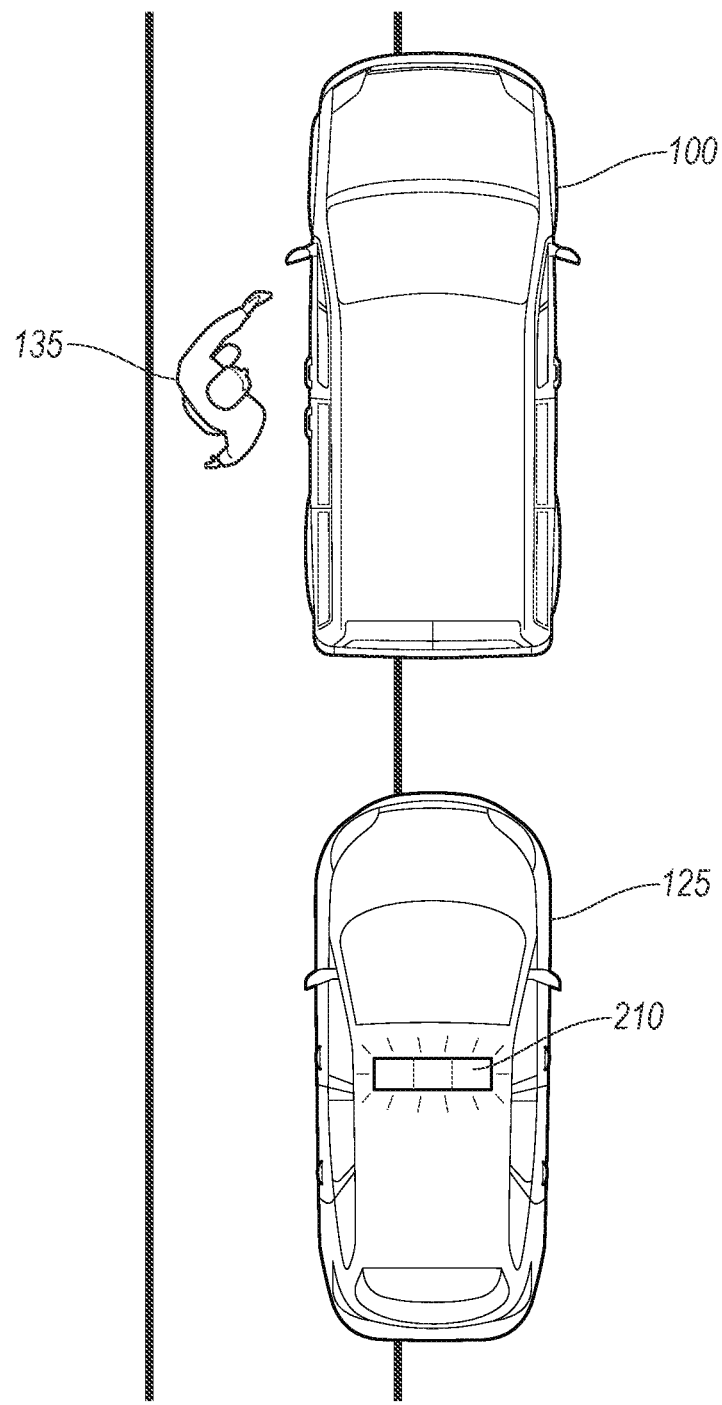
FIG. 5 is a top diagrammatic view of a target vehicle and the host vehicle.

With reference to FIG. 5, the target vehicle 125 includes the prespecified indicia 210 that are usable to identify the target vehicle 125 as the target vehicle 125. For example, if the target vehicle 125 is a police vehicle, an ambulance, a fire engine, or any other official vehicle, the prespecified indicia 210 can include flashing lights, a siren, painted markings on its body, etc. The flashing lights can use particular colors, e.g., colors officially reserved for the target vehicles 125. The target vehicle 125 can be in an active mode, in which the siren and/or the flashing lights are active, or in an inactive mode, in which the siren and the flashing lights are inactive. The personnel 135 are one or more individuals associated with the target vehicle 125. The personnel 135 can be wearing uniforms identifying them as such.

The computer 120 can be programmed to detect the target vehicle 125 having the prespecified indicia 210, e.g., detect the target vehicle 125 that is in an active mode, e.g., the prespecified indicia 210 include flashing lights that are actively flashing. For example, the computer 120 can receive data from the sensors 205, e.g., image data, and can identify the target vehicle 125 as a target vehicle 125 based on the data from the sensors 205. The computer 120 can identify the target vehicle 125 using conventional image-recognition techniques, e.g., a convolutional neural network programmed to accept images as input and output an identified object. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is the type with the highest score. The neural network can rely on the prespecified indicia 210 to assign a higher score for a target vehicle 125 in the active mode, e.g., on the flashing lights being active. If the outputted type is a target vehicle 125 having the prespecified indicia 210, then the computer 120 has detected the target vehicle 125 having the prespecified indicia 210.

For another example, the computer 120 can receive audio data from the external microphone 170 and can identify the target vehicle 125 as a target 125 based on the audio data. For example, the computer 120 can identify audible prespecified indicia 210, e.g., the sound of the siren, of the target vehicle 125 based on a distinctive sound pattern, e.g., for a siren, periodic increasing and decreasing frequency of sound emitted by the siren.

The computer 120 can be programmed to perform the operations described below in response to detecting the target vehicle 125 having the prespecified indicia 210. The computer 120 can be programmed to refrain from performing the operations below in response to not detecting the target vehicle 125 having the prespecified indicia 210, e.g., in response to detecting one or more target vehicles 125, none having the prespecified indicia 210. In other words, in response to not detecting the target vehicle 125 having the prespecified indicia 210, the computer 120 does not automatically output a message to the personnel 135, instruct the user interface 115 and/or the display screen 110 to output a transcription of speech from the personnel 135, etc. In situations in which the host vehicle 100 is pulled over with a target vehicle 125 lacking the prespecified indicia 210, the occupant 130 is interacting with an individual that is not the personnel 135, etc., the computer 120 can perform one or more of the operations described below in response to receiving an input from the occupant 130, e.g., via the user interface 115, e.g., the computer 120 can instruct the user interface 115 and/or the display screen 110 to output a transcription of speech from the individual, in the manner described below.

The computer 120 can be programmed to detect the personnel 135 from the target vehicle 125. For example, the computer 120 can identify the personnel 135 using conventional image-recognition techniques, e.g., a convolutional neural network as described above. The neural network can rely on aspects of a uniform worn by the personnel 135 to assign a higher score to personnel 135 from the target vehicle 125. The neural network can rely on having already detected the target vehicle 125 stopped near the host vehicle 100 to assign a higher score to personnel 135 from the target vehicle 125.

The computer 120 can be programmed to instruct the display screen 110 to output a message to the personnel 135. The display screen 110 can show the message as text, as shown in FIG. 2. The message can indicate a communication impairment of the occupant 130, i.e., a condition that makes communication more difficult between the occupant 130 and the personnel 135. For example, the occupant 130 can be deaf or hard of hearing. For another example, the occupant 130 may not speak the local language or may speak the local language at a low proficiency. The message can be based on an identification of the occupant 130, and the communication impairment can be stored in a profile associated with the occupant 130. The message may be in text using the language common to the region, may alternate between the most common languages (e.g., English and Spanish), and/or may contain a universal symbol indicating the communication impairment. The computer 120 can instruct the external speaker 175 to simultaneously output an audio version of the message or of some form of the message.

The computer 120 can be programmed to instruct the user interface 115 and/or the display screen 110 to output a transcription of speech from the personnel 135 detected by the external microphone 170. The transcription outputted by the user interface 115, e.g., the UI screen 190, can inform the occupant 130 of what the personnel 135 is saying or requesting. The transcription outputted by the display screen 110 can inform the personnel 135 of whether the transcription is accurate and can inform the occupant 130 if the personnel 135 requests the occupant 130 to exit the vehicle. The computer 120 can use any suitable algorithm for converting speech to text, e.g., hidden Markov models, dynamic time warping-based speech recognition, neural networks, end-to-end speech recognition, etc.

The computer 120 can be programmed to instruct the display screen 110 to display a plurality of icons and, in response to the selection of one of the icons by the personnel 135, instruct the user interface 115 to output a corresponding message. The icons can represent commonly requested documents, e.g., a driver's license, a registration of the host vehicle 100, insurance documentation, etc.; and/or traffic violations, e.g., speeding, tailgating, failing to stop, headlight missing, etc. For example, the computer 120 can, in response to the personnel 135 selecting driver's license, instruct the user interface 115 to output a message requesting the driver's license of the occupant 130, or in response to the personnel 135 selecting speeding, instruct the user interface 115 to output a message indicating that the personnel 135 pulled over the occupant 130 for speeding.

The computer 120 can be programmed to instruct the user interface 115 to output a plurality of possible responses to the occupant 130 and, upon receiving a selection of one of the possible responses, instruct the display screen 110 to output the selected possible response. The possible responses can be phrases commonly used in a conversation with the personnel 135, e.g., "I understand," "I do not understand," "I am reaching for the requested document," "Am I being detained?," etc.

The memory of the computer 120 can store a plurality of electronic documents. The stored electronic documents can include a driver's license of the occupant 130, a registration of the host vehicle 100, insurance documentation for the host vehicle 100 or occupant 130, a concealed carry permit, etc. The stored electronic documents can include, e.g., respective certificates or other security features that serve to authenticate the stored electronic documents.

The computer 120 can be programmed to output one or more of the stored electronic documents in response to detecting the personnel 135 upon receiving approval from the occupant 130. For example, in response to detecting the personnel 135, e.g., upon receiving the selection of one of the icons representing one of the stored electronic documents by the personnel 135, the computer 120 can instruct the user interface 115 to prompt the occupant 130 for an approval to output the stored electronic document. The prompt for approval can be a message such as "Transmit driver's license?" with affirmative and negative options such as "Yes" and "No." The computer 120 can output the document upon receiving the approval, i.e., conditional on receiving the approval, e.g., the occupant 130 selecting "Yes."

The computer 120 can be programmed to output one or more of the stored electronic documents via one or more of a plurality of mediums. For example, the computer 120 can instruct the display screen 110 to display the stored electronic document. For another example, the computer 120 can instruct the transceiver 200 to transmit the stored electronic document to one or more devices that are remote from the host vehicle 100. The devices can include a mobile device of the personnel 135, a mobile device of the occupant 130 that the occupant 130 can hand to the personnel 135, and/or a device built into the target vehicle 125.

The computer 120 can be programmed to record and store image data and/or audio data of the interaction between the occupant 130 and the personnel 135. The image data can be or include video data. The computer 120 can receive the image data from the camera 145 and the audio data from the external microphone 170. The computer 120 can store the image data from the camera 145 showing the personnel 135. For example, the computer 120 can store one or more still images of image data from the camera 145. For another example, the computer 120 can begin recording and storing the video data received from the camera 145 in response to detecting the personnel 135. The computer 120 can begin recording and storing the audio data received from the external microphone 170 in response to detecting the personnel 135, e.g., simultaneous with and accompanying the video data. The computer 120 can continue recording and storing the video data received from the camera 145 and audio data received from the external microphone 170 until the personnel 135 is absent. The computer 120 can determine that the personnel 135 is absent by failing to detect the personnel 135 in the manner described above. The recorded image data, video data, and audio data can be stored indefinitely and/or transmitted via the transceiver 200 to a remote server.

Figure 6:
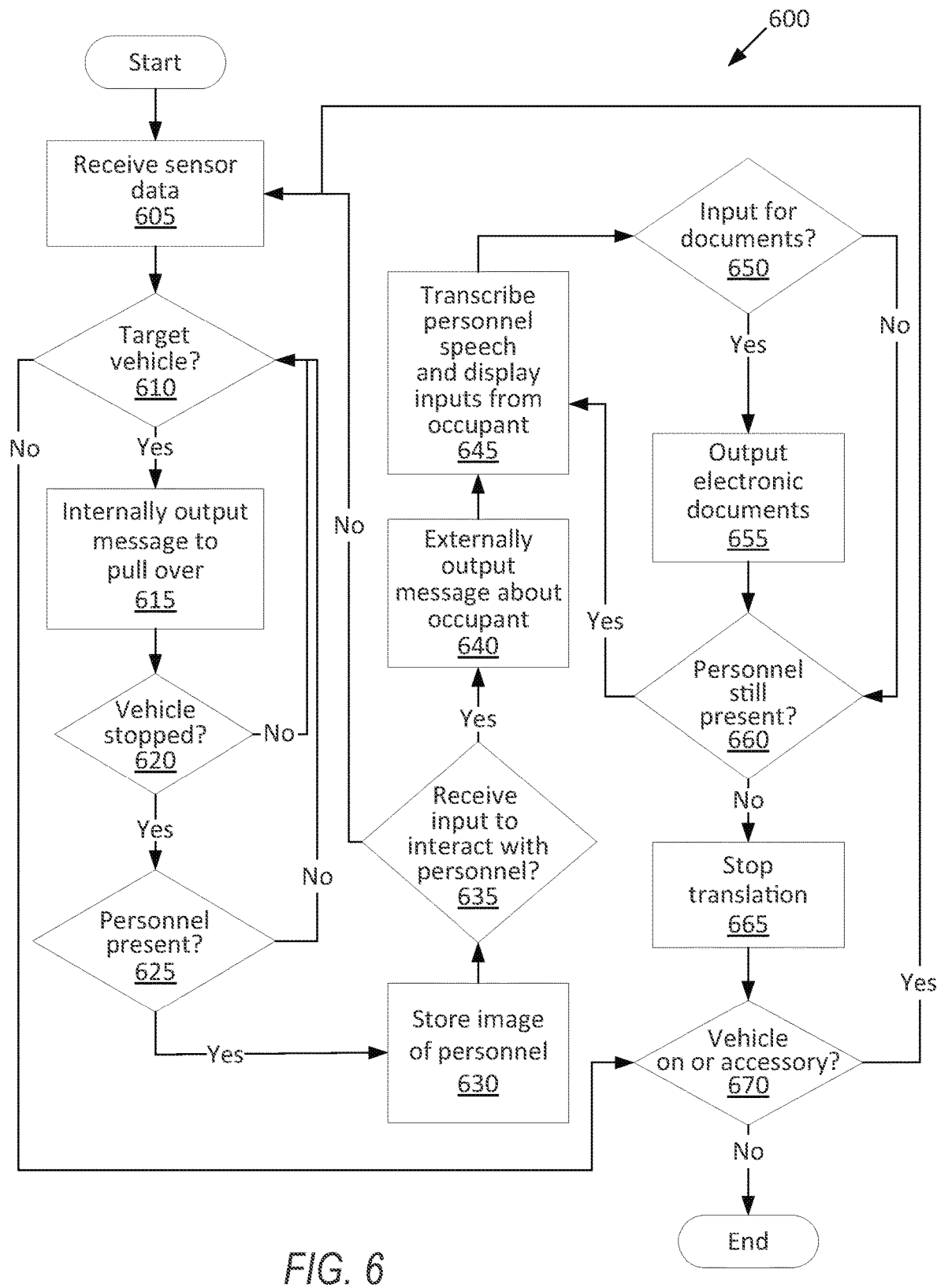
FIG. 6 is a process flow diagram of an example process for the host vehicle to interact with the target vehicle.

FIG. 6 is a process flow diagram illustrating an exemplary process 600 for the host vehicle 100 to interact with the target vehicle 125 and personnel 135. The memory of the computer 120 stores executable instructions for performing the steps of the process 600 and/or programming can be implemented in structures such as mentioned above. As a general overview of the process 600, in response to detecting the target vehicle 125, the computer 120 instructs the user interface 115 to output an instruction to the occupant 130. Then, in response to the host vehicle 100 being stopped and detecting the personnel 135, the computer 120 begins storing the image data and audio data of the personnel 135. Then, upon receiving an approval from the occupant 130 to interact with the personnel 135, the computer 120 instructs the display screen 110 to output the message indicating the communication impairment of the occupant 130, outputs the transcription of the speech from the personnel 135, and outputs the responses selected by the occupant 130. Upon receiving the approval from the occupant 130, the computer 120 outputs the stored electronic documents. The recording, transcription, and outputting of responses continue until the personnel 135 is absent. The process 600 continues for as long as the host vehicle 100 is in either an on state or an accessory-power state.

The process 600 begins in a block 605, in which the computer 120 receives data from the sensors 205.

Next, in a decision block 610, the computer 120 detects whether the target vehicle 125 is present based on the data from the sensors 205, as described above. In response to detecting the target vehicle 125, the process 600 proceeds to a block 615. If the target vehicle 125 is absent, the process 600 proceeds to a decision block 670.

In the block 615, the computer 120 instructs the user interface 115 to output an instruction to the occupant 130, e.g., via the UI screen 190. The instruction can indicate to the occupant 130 that the target vehicle 125 has been detected and that the occupant 130 should pull over the host vehicle 100.

Next, in a decision block 620, the computer 120 determines whether the host vehicle 100 is stopped, e.g., whether the occupant 130 has had the opportunity to pull over the host vehicle 100. In response to the host vehicle 100 being stopped, the process 600 proceeds to a decision block 625. If the host vehicle 100 is still moving, the process 600 returns to the decision block 610 to continue monitoring the target vehicle 125.

In the decision block 625, the computer 120 detects whether the personnel 135 is present, as described above. For example, the computer 120 can further determine whether the personnel 135 is less than a threshold distance from the display screen 110. The threshold distance can be chosen such that the personnel 135 is likely able to read the display screen 110 but has not yet reached the door 160 of the host vehicle 100, e.g., four feet. The computer 120 can determine whether the personnel 135 is less than the threshold distance from the display screen 110 based on data from the sensors 205, e.g., from a radar sensor or ultrasonic sensor. In response to detecting the personnel 135, e.g., within the threshold distance, the process 600 proceeds to a block 630. Otherwise, the process 600 returns to the decision block 610 to continue monitoring the target vehicle 125.

In the block 630, the computer 120 begins recording and storing image data from the camera 145 and audio data from the external microphone 170, as described above.

Next, in a decision block 635, the computer 120 determines whether the computer 120 has received an approval from the occupant 130 to interact with the personnel 135. The computer 120 can instruct the user interface 115 to prompt the occupant 130 for the approval. The computer 120 can then receive an input granting or denying the approval via the user interface 115. In response to receiving the approval, the process 600 proceeds to a block 640. In response to receiving a negative selection or to not receiving a selection within a time threshold, the process 600 returns to the block 605 to restart monitoring for target vehicles 125.

In the block 640, the computer 120 instruct the display screen 110 to output the message to the personnel 135 indicating the communication impairment of the occupant 130, as described above.

Next, in a block 645, the computer 120 instructs the user interface 115 and the display screen 110 to output the transcription of the speech from the personnel 135, and the computer 120 instructs the display screen 110 to output responses selected by the occupant 130, as described above.

Next, in a decision block 650, the computer 120 determines whether the computer 120 received an approval from the occupant 130 via the user interface 115 to output the stored electronic documents, as described above. In response to receiving the approval, the process 600 proceeds to a block 655. Otherwise, the process 600 proceeds to a decision block 660.

In the block 655, the computer 120 outputs the stored electronic documents, as described above. After the block 655, the process 600 proceeds to the decision block 660.

In the decision block 660, the computer 120 determines whether the personnel 135 is still present or is absent, as described above. The computer 120 can determine the presence or absence of the personnel 135 without regard for the threshold distance mentioned with respect to the decision block 625; i.e., the personnel 135 detected outside the threshold distance from the display screen 110 is treated as present, not absent. In response to the personnel 135 still being present, the process 600 returns to the block 645 to continue facilitating the communication between the personnel 135 and the occupant 130. If the personnel 135 is absent, the process 600 proceeds to a block 665.

In the block 665, the computer 120 stops providing the transcription and outputting the responses, and the computer 120 stops recording the image data and audio data of the personnel 135. After the block 665, the process 600 proceeds to the decision block 670.

In the decision block 670, the computer 120 determines whether the host vehicle 100 is either in an on state or in an accessory-power state. For the purposes of this disclosure, "on state" is defined as the state of the host vehicle 100 in which full electrical energy is provided to electrical components of the host vehicle 100 and the host vehicle 100 is ready to be driven, e.g., the engine is running; "off state" is defined as the state of the host vehicle 100 in which a low amount of electrical energy is provided to selected electrical components of the host vehicle 100, typically used when the host vehicle 100 is being stored; and "accessory-power state" is defined as the state of the host vehicle 100 in which full electrical energy is provided to more electrical components than in the off state and the host vehicle 100 is not ready to be driven. If the occupant 130 turns the host vehicle 100 off, the host vehicle 100 can remain in the accessory-power state for a period of time before entering the off state, e.g., either until a preset time has elapsed or one of the doors 160 has been opened, whichever is shorter. The host vehicle 100 may also enter the off state from the accessory-power state in response to a charge of a low-voltage battery falling below a threshold. If the host vehicle 100 is in the on state or the accessory-power state, the process 600 returns to the block 605 to continue monitoring for target vehicles 125. If the host vehicle 100 is in the off state, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
a display screen positioned to display on an exterior of a host vehicle;
a user interface of the host vehicle; and
a computer of the host vehicle communicatively coupled to the display screen and the user interface; wherein the computer is programmed to:
in response to detecting a target vehicle having prespecified indicia, instruct the user interface to output an instruction to an occupant of the host vehicle;
in response to detecting personnel from the target vehicle, instruct the display screen to output a message to the personnel;
after the display screen outputs the message, instruct the display screen to display a plurality of icons, a memory of the computer storing a plurality of messages paired with the icons; and in response to a selection of one of the icons by the personnel, instruct the user interface to output a corresponding one of the plurality of messages to the occupant;

wherein the computer is programmed to detect the personnel from the target vehicle by using image recognition, the image recognition assigning a higher score based on detecting the target vehicle stopped near the host vehicle.

2. The system of claim 1, further comprising an external microphone communicatively coupled to the computer, wherein the computer is programmed to, in response to detecting the personnel, instruct the user interface to output a transcription of speech from the personnel detected by the external microphone.

3. The system of claim 2, wherein instructing the user interface to output the transcription is conditional on the personnel being less than a threshold distance from the display screen.

4. The system of claim 1, further comprising an external microphone communicatively coupled to the computer, wherein the computer is programmed to, in response to detecting the personnel, instruct the display screen to output a transcription of speech from the personnel detected by the external microphone.

5. The system of claim 1, further comprising a camera communicatively coupled to the computer, wherein the computer is programmed to, in response to detecting the personnel, store image data from the camera showing the personnel.

6. The system of claim 5, wherein the image data includes video data, and the video data is recorded until the personnel is absent.

7. The system of claim 1, further comprising an external microphone communicatively coupled to the computer, wherein the computer is programmed to, in response to detecting the personnel, record audio data from the external microphone until the personnel is absent, and store the audio data.

8. The system of claim 1, wherein the instruction indicates to the occupant to pull over the host vehicle.

9. The system of claim 1, wherein the message to the personnel states that the occupant has a communication impairment.

10. The system of claim 1, wherein the computer is programmed to, in response to detecting the personnel, instruct the user interface to output a plurality of possible responses to the occupant, and upon receiving a selection of one of the possible responses, instruct the display screen to output the selected possible response.

11. The system of claim 1, wherein the computer is programmed to, in response to detecting the personnel, output a stored electronic document.

12. The system of claim 11, wherein outputting the stored electronic document is conditional on receiving an approval from the occupant via the user interface.

13. The system of claim 11, wherein outputting the stored electronic document includes instructing the display screen to display the stored electronic document.

14. The system of claim 11, wherein outputting the stored electronic document includes transmitting the stored electronic document to a device that is remote from the host vehicle.

15. The system of claim 11, wherein the stored electronic document includes at least one of a driver's license, a registration of the host vehicle, or insurance documentation.

16. The system of claim 1, wherein instructing the display screen to output the message to the personnel is conditional on receiving an approval from the occupant via the user interface.

17. The system of claim 16, wherein the computer is programmed to, in response to detecting the personnel, instruct the user interface to prompt the occupant for the approval.

18. The system of claim 1, wherein instructing the display screen to output the message to the personnel is conditional on the host vehicle being stopped.

19. A method comprising:
in response to detecting a target vehicle having prespecified indicia, instructing a user interface of a host vehicle to output an instruction to an occupant of the host vehicle;

in response to detecting personnel from the target vehicle, instructing a display screen of the host vehicle to output a message to the personnel, wherein the display screen is positioned to display on an exterior of the host vehicle;

after the display screen outputs the message, instructing the display screen to display a plurality of icons, a memory of a computer of the host vehicle storing a plurality of messages paired with the icons; and in response to a selection of one of the icons by the personnel, instructing the user interface to output a corresponding one of the plurality of messages to the occupant;

wherein the computer is programmed to detect the personnel from the target vehicle by using image recognition, the image recognition assigning a higher score based on detecting the target vehicle stopped near the host vehicle.

* * * * *